United States Patent [19]
Stearns et al.

[11] 3,958,035
[45] May 18, 1976

[54] METHOD OF MANUFACTURING OMELET TYPE EGG PRODUCT

[75] Inventors: Charles K. Stearns, Prospect Heights; Andrew D. Singleton, Northfield, both of Ill.

[73] Assignee: Kraftco Corporation, Glenview, Ill.

[22] Filed: Mar. 11, 1974

[21] Appl. No.: 450,204

Related U.S. Application Data

[63] Continuation-in-part of Ser. No. 286,899, Sept. 7, 1972, abandoned.

[52] U.S. Cl.............................. 426/614; 426/511; 426/523; 426/524
[51] Int. Cl.² ............................................ A23C 3/00
[58] Field of Search .......... 426/211, 523, 348, 524, 426/614, 474, 506, 509–511, 512, 519, 520, 523, 524

[56] References Cited
UNITED STATES PATENTS

| | | | |
|---|---|---|---|
| 3,009,818 | 11/1961 | Jokay | 99/210 |
| 3,510,315 | 5/1970 | Hawley | 99/113 |
| 3,624,230 | 11/1971 | Robinson | 426/348 |
| 3,753,737 | 8/1973 | Latham | 426/523 |
| 3,769,404 | 10/1973 | Latham | 426/211 |

OTHER PUBLICATIONS
Everybody's Cook Book – Lord, Helt & Co., N.Y. 1924, pp. 303, 304.

*Primary Examiner*—Norman Yudkoff
*Assistant Examiner*—Hiram H. Bernstein
*Attorney, Agent, or Firm*—Fitch, Even, Tabin & Luedeka

[57] ABSTRACT

A method is provided for making an omelet type egg product suitable for storage by freezing. Egg whites and egg yolks are agitated sufficiently to break the yolks and provide an egg mix. The moisture of the egg mix is adjusted and a predetermined amount of the egg mix is placed in a pan. The egg mix is heated while quiescent in the pan sufficiently to substantially cook the egg mix and set the egg mix to provide an egg product in the shape of the pan. The egg product is removed and is folded to provide an omelet type egg product. The folding of the egg product is effected in a particular manner and occurs within a predetermined period from the end of the heating step. The omelet type egg product may be stored under refrigeration conditions or may be frozen under particular conditions to provide a frozen type egg product that may be stored for an indefinite period of time.

7 Claims, 3 Drawing Figures

U.S. Patent  May 18, 1976  3,958,035
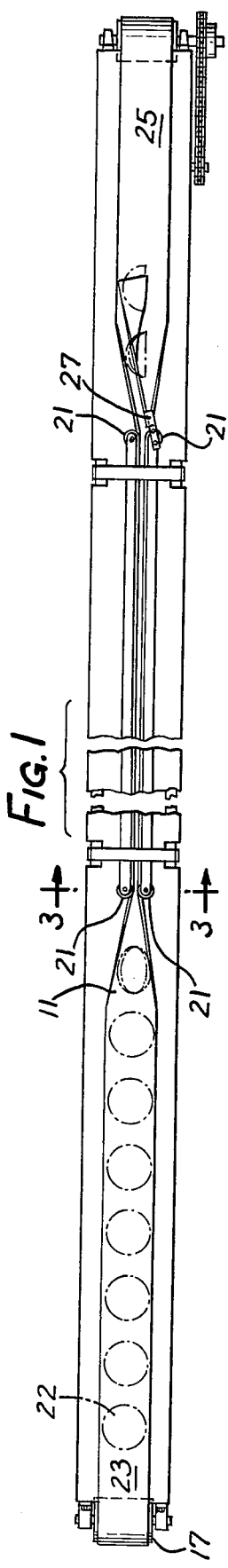
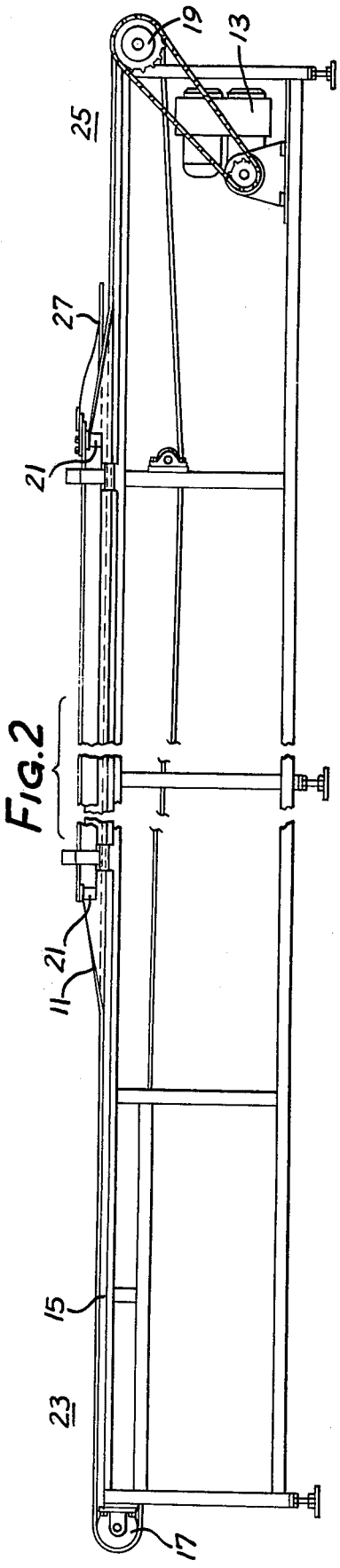
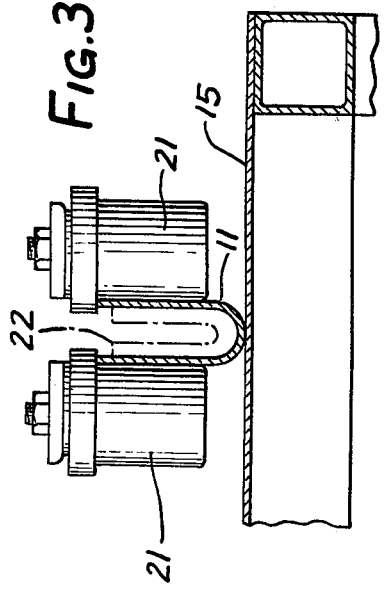

METHOD OF MANUFACTURING OMELET TYPE EGG PRODUCT

The present application is a continuation-in-part of U.S. Pat. application Ser. No. 286,899, filed Sept. 7, 1972 and now abandoned.

The present invention relates generally to a method for making an egg product which is substantially cooked and which may be stored for future consumption. More particularly, the present invention is directed to making an omelet type egg product which may be frozen and stored.

It is well known that the preparation of omelets from whole eggs in the home and in restaurants is a procedure requiring a high level of culinary skill. In the usual process, whole eggs are broken into a bowl and are vigorously beaten to break the yolks and blend the yolks with the egg white, and further to incorporate some air therein. The beaten egg mix may have milk or other fluid added thereto to provide a less voluminous final product. The egg mix is then added to a heated pan of the proper diameter so that the egg mix covers the bottom of the pan. The pan is carefully heated to a suitable temperature prior to adding the egg mix thereto. In this connection, most cookbooks specify that the temperature should be hot enough to rapidly melt a cube of butter added thereto, but not so hot as to burn and blacken the butter. After adding the egg mix to the pan, the pan is shaken from side to side as the egg mix is stirred in the pan. As the egg mix is heated, the eggs begin to set or coagulate and the bottom of the egg mix is lifted from the pan, permitting fluid egg mix to flow underneath the set portion of the egg mix and continue the cooking process. Near the end of the cooking process, the omelet is folded by lifting one side of the pan and starting to roll the edge of the omelet over the surface of the omelet so as to fold the omelet upon itself. Thereafter, the omelet is removed from the pan in a folded condition.

From the above description, it will be understood that the usual methods for preparation of omelets are intricate and require a high level of skill. Such methods are not readily suitable for the preparation of large quantities of omelets and are furthermore not suitable for the continuous preparation of omelets. A further drawback in the preparation of omelets in large quantities, or for commercial utilization, is that the omelet must be consumed immediately after preparation. It is not considered feasible to prepare an omelet in advance and to cool and thereafter rewarm the omelet for consumption at a later time. If the omelet is cooled and later rewarmed, the omelet tends to become tough and rubbery in texture. Furthermore, if the omelet is cooled and subsequently frozen and thereafter thawed, the omelet tends to become very tough, and some moisture syneresis is obtained. Accordingly, it would be desirable to provide a method for the manufacture of omelet type egg products wherein the method is adaptable for large scale and rapid manufacture of multiple omelet units. It would further be desirable to provide a method for the manufacture of omelet type egg products wherein the egg product is suitable for storage and subsequent utilization at a later time.

Accordingly, it is a principal object of the present invention to provide a method for making an egg product. It is another object of the present invention to provide a method for making an omelet type egg product which is suitable for storage. It is a further object of the present invention to provide a method for making an egg product suitable for storage, which method is adapted for continuous and rapid production of egg product units. It is still a further object of the present invention to provide a method for preparing an omelet type egg product and to thereafter store the egg product under freezing conditions.

These and other objects of the present invention will become more apparent from the following detailed description and the accompanying drawings wherein:

FIG. 1 is a top plan view of apparatus suitable for folding the egg product of the invention;

FIG. 2 is a side elevation of the appratus of FIG. 1 and

FIG. 3 is partial cross-section taken along the lines 3—3 of FIG. 1.

Generally, in accordance with various features of the present invention a method is provided for making an omelet type egg product suitable for storage by freezing. In the method egg whites and egg yolks are provided wherein the egg white and egg yolk are present at substantially the proportions of whole egg. The egg whites and egg yolks are agitated sufficiently to break the yolks and provide an egg white and egg yolk mix. The moisture of the egg mix is then adjusted to a level from about 75 to about 85 percent water by weight of the egg mix. A predetermined amount of the egg mix is then placed in a pan. The egg mix is then heated in the pan sufficiently to set the egg mix and provide an egg product in the shape of the pan. The egg mix is maintained quiescent during the heating step. The egg product is then removed from the pan and the egg product is folded to provide an omelet type egg product, which may enfold a filling. The folding of the egg product to provide an omelet type egg product occurs within a particular period from the end of the heating step. The omelet type egg product may then be stored for limited periods of time under refrigeration conditions or may be frozen under particular conditions to provide a frozen omelet type egg product that may be stored for an indefinite period of time.

In providing the egg mix of the present invention whole eggs may be used or separated egg white and egg yolk may be combined to provide an egg mix having substantially the same proportions of egg white and egg yolk as whole eggs.

The egg white and egg yolk are agitated and mixed sufficiently to break the egg yolk and provide a substantially homogenous egg mix. The agitation should not be so great as to incorporate a substantial level of air into the mix. It is also not necessary to provide a completely homegenous mixture of the egg white and egg yolk in the egg mix.

The moisture of the egg mix is adjusted to provide a total moisture level of from about 78 to about 85 percent by weight of the egg mix. The moisture can be provided by any suitable source such as water, milk, fruit juice or mixtures thereof. Whole eggs have a moisture level of about 75 percent and additional moisture is added to the egg mix to provide moisture within the indicated range. It is important in providing the egg mix of the invention to establish the moisutre of the egg mix within the indicated range to provide suitable qualities in the egg mix for cooking and subsequent storing under refrigeration or freezing conditions.

After providing the egg mix with a moisture level within the indicated range, a predetermined amount of the egg mix is placed in a pan. For an omelet type egg product suitable for a single serving this amount is usually from about 100 grams to about 250 grams. Of course, lower and higher amounts can be used if smaller portions or multiple portions are desired. The shape of the pan is not important, but the traditional round or oblong shape is preferred. This does not, however, preclude the use of square or rectangular or other irregular shaped pans. The pan size is selected so that the amount of egg mix placed in the pan is sufficient to cover the bottom of the pan and provide a depth of egg mix of from about ⅛ inch to about ½ inch within the pan. The pan is preferably pre-treated to provide suitable release properties after the egg mix is cooked and set. In this connection, it is preferred to use pans having a polytetrafluoroethylene coating thereon. Uncoated metal pans may also be used if they are provided with a suitable release coating, such as fats, oils and other edible release coating materials.

The temperature of the pan at the time of placing the egg mix therein is not critical so long as the temperature is below about 200°F. The time required to cook the egg mix is related to the temperature of the egg mix and the temperature of the pan at the time of placing the egg mix within the pan but such temperature, as indicated, is not critical. The temperature of the egg mix may be in the range of 80°F to about 155°F and the temperature of the pan may be within the range of from ambient temperature to about 200°F.

The egg mix is then heated in the pan, while the egg mix is maintained quiescent, until the egg mix is set so as to provide a substantially cooked egg product in the shape of the pan. The term "substantially cooked" means that sufficient denaturation of the egg protein has occurred to effect setting the egg mix in the shape of the pan but the egg mix has not been subjected to heat for a time sufficient to dry out the egg mix and provide an undesirable, tough, dry or leathery omelet type egg product. Heating may be effected by any suitable means, but it is preferred that heating be effected by a method wherein both the top surface of the egg mix and the bottom surface of the pan is heated at the same time. Heating may be effected in conventional convection ovens, infra red ovens or microwave ovens or other suitable heating equipment. For high speed production it is preferred to place the pans containing the egg mix on a conveyor and transport the pans with the egg mix through the oven by means of a conveyor. In general, it is sufficient to heat the egg mix in an oven maintained at a temperature of from about 350°F to about 475°F for a period of from about 5 minutes to about 20 minutes so as to set the egg mix without overcooking and drying the egg product that results. Some puffing of the egg mix occurs during cooking and the thickness of the egg product after cooking is from about ¼ inch to about ¾ inch.

To reduce the heat load in the oven it is preferred to preheat the egg mix prior to placing the egg mix in the pan. The denaturation or setting temperature for eggs is about 150°F to about 160°F. The egg mix can be preheated to a temperature of less than about 135°F and held for substantial periods of time without undergoing coagulation or thickening. It is preferred to preheat the egg mix to a temperature within the range of from about 100°F to about 135°F.

In a particularly preferred embodiment, the preheated egg mix is further heated by steam injection immediately prior to placing the egg mix in the pans. Surprisingly, it has been determined that the egg mix can be heated by steam injection to temperatures above the denaturation or setting temperature of the egg mix without effecting any substantial setting of the egg mix, if the steam injection heating occurs just prior to placing the egg mix in the pan. It is preferred to heat the egg mix by steam injection to a temperature in the range of from about 160°F to about 170°F.

When such preheating and steam injection heating are used, the time required to heat and set the egg mix in the oven is greatly reduced. Also, higher oven temperatures, in the range set forth above, can be used without risk of undue browning or burning of the surface of the egg mix.

After the egg mix has been cooked to provide an egg product, the egg product is removed from the pan and is thereafter folded in half to provide a traditional half-moon shaped omelet type egg product. The removal of the egg product from the pan and folding of the egg product to provide an omelet type egg product must be effected within a period of less that about 2 minutes from the time that the egg product in the pan is removed from the heating apparatus.

Folding of the egg product to provide an omelet type egg product is effected in a particular manner. In this connection, it has been determined that the temperature of the egg product at the time of folding and the radius maintained at the center of the egg product during folding are important to prevent cracking of the egg product. As indicated, the folding should take place within about 2 minutes from the time that the egg product is removed from the heating apparatus. During this time period the egg product retains sufficient heat to permit the folding to take place. During the folding the radius of curvature at the center of the egg product (measured at the exterior surface) is gradually decreased over a period of time.

In a preferred method for folding the egg product, the egg product is removed from the pan and a center portion of the egg product is supported. Opposing edges of the egg product are then moved upward so as to cause opposing surfaces of the egg product, which are adjacent to the center portion of the egg product, to pivot upwardly from the center and move into substantial alignment in face to face relationship.

In this connection, the exterior surface of the center portion of the egg product is changed from a flat surface (infinite radius of curvature) to a substantially semicircular configuration. The radius of curvature of the exterior surface of the egg product is decreased from a flat surface to less than about 3 times the thickness of the egg product in a period of time of from about 2 seconds to about 2 minutes. After the egg product has been folded, the egg product is restrained in a folded condition for a period of time of at least about 10 seconds to permit the egg product to set. The egg product may be restrained in a folded condition for as long as is desired. After the folding step, the center portion of the egg product gradually slumps and the radius of curvature of the exterior surface gradually approaches the thickness of the egg product. If the egg product is folded in the manner described cracking of the egg product does not occur. After the egg product has been folded in the manner described to provide an omelet type egg product, the omelet type egg product may be permitted to rest on one of its sides.

Apparatus suitable for folding the omelet type egg product is shown in FIGS. 1–3. The apparatus comprises a flexible belt 11 which is driven by a motor 13. The belt 11 passes over a table 15 and around sprockets 17 and 19. At an intermediate point in its travel, the flexible belt 11 is urged by a plurality of verticle rollers 21 into a U-shape.

The omelet type egg product is folded by placing the product 12 on a first end 23 of the belt 11 where the belt is flat. As the belt proceeds along its path the product is gradually urged into a U-shape by the movement of the belt through the rollers. The U-shaped position of the belt with the product in a folded position is best seen in FIG. 3.

The belt exits from the plurality of rollers and resumes a flat position at a second end of the belt 25. During the transition of the belt from a U-shape to a flat shape, the product is restrained against one side of the belt by restraining arm 27. Restraining arm 27 prevents the product from opening up or sliding on the belt as the product proceeds from an upright to a flat position.

The omelet type egg product may then be stored under refrigeration conditions for a short period of time prior to consumer use. In this connection refrigeration conditions refer to temperatures in the range from about 33°F to about 48°F. Storage under refrigeration conditions may be effected for a period of up to about two weeks. If it is desired to store the omelet type egg product for a longer period of time the omelet type egg product may be frozen.

Freezing of the omelet type egg product requires particular conditions or the product tends to crack or become tough and rubbery. In describing the particular conditions, reference will be made to the center temperature of the omelet type egg product. The center temperature is the temperature at the center of the thickest part of the omelet type egg product.

It has been determined that freezing of the omelet type egg product must be effected under conditions wherein the temperature of the center is reduced from a temperature above the freezing point of the omelet type egg product to a temperature below the freezing point of the omelet type egg product within a period of less than about 10 minutes and preferably as fast as possible.

The freezing point of the omelet type egg product is in the range of from about 10°F to about 20°F.

It has also been determined that it is not possible to provide rapid enough freezing if the omelet type egg product is placed within a commercial freezer having a temperature in the range of about −15°F to about −30°F. If the omelet type egg product is placed in such a freezing environment, the reduction of temperature is too slow and the omelet type egg product does not become frozen rapidly enough to provide a suitable product. Under such slow freezing conditions, the omelet type egg product becomes tough and rubbery upon thawing and is not considered a desirable product.

A suitable method for effecting freezing of the omelet type egg product is to subject the omelet type egg product to a cryogenic environment. The freezind may be effected by immersing the omelet type egg product in a cryogenic liquid. Under these conditions the coefficient of heat transfer is high and the cryogenic liquid may have a temperature as high as −25°F. However, it is preferred to pass the omelet type egg product through a chamber in which a cryogenic liquid is sprayed. Under these conditions of freezing the coefficient of heat transfer is low and the cryogenic liquid should have a temperature of less than about −100°F.

It is desirable to control the rate of temperature decrease below about 20°F. It is believed that a major phase change occurs in the omelet type egg product at a temperature in the range of from about 10°F to about 20°F. If the omelet type egg product is not removed from the cryogenic environment prior to attaining a center temperature of about −20°F, there is a tendency for the center temperature to rapidly decline and such rapid reduction in temperature below −20°F may tend to shatter the omelet type egg product as it is being frozen or as it is being removed from the cryogenic environment.

Prior to commercial distribution the omelet type egg product is wrapped in a suitable covering material. It is preferred to wrap the omelet type egg product in a plastic film. Preferred plastic films are those that have suitable characteristics to permit immersing the wrapped omelet type egg product in hot or boiling water to effect heating. Metal foil packaging materials may also be used. The omelet type egg product may be wrapped prior to freezing or may be wrapped after the freezing step has been effected.

It has been determined that the eating qualities and tenderness of the omelet type egg product upon subsequent heating from the frozen condition are improved if a small amount of a farinaceous material is included in the egg mix. In a preferred embodiment of the invention, a farinaceous material is added to the egg mix at a level of from about 1 to about 5 percent by weight of the egg mix. Preferred farinaceous materials are wheat flour, rice flour, corn flour, barley flour and mixtures thereof.

The following example further illustrates various features of the invention, but is intended to in no way limit the scope of the invention which is defined in the appended claims.

EXAMPLE I 24 dozen whole eggs were broken into a 10 gallon receptacle. Whole milk was added to the whole eggs at a level sufficient to establish a moisture level of 80 percent. The proportion of whole eggs to milk was 105 grams to 57 grams. The whole egg and water mixture was agitated by means of a propeller type mixer for a period of 5 minutes so as to break the yolk of the eggs and to provide an egg mix.

163 gram portions of the egg mix were placed into a polytetrafluoroethylene lined aluminum pan. The aluminum pan was 8 inches in diameter and the egg mix covered the pan to a depth of ⅝ inches. The pan was at ambient temperature at the time that the egg mix was added.

A plurality of the filled pans were placed upon a conveyor which passed into an oven maintained at a temperature of 410°F. The elapsed time of the pans in the ovens was 11 minutes and heating was sufficient to set the egg mix to provide an egg product in the shape of the pan without overcooking the egg product. The egg product has a center temperature of 180°F at the time of exiting from the oven.

After the pans were removed from the oven, the egg product was immediately removed from the pans and was folded into an omelet shape. Folding was effected by supporting a center portion of the egg product and thereafter raising opposing edges of the egg product in a vertical direction until opposing sides of the egg product were in face to face relation. The egg product was then placed on its side and was cooled to ambient temperature. The omelet type egg product was then overwapped with a plastic film which was sealed around the omelet type egg product.

The omelet type egg product was then frozen by placing the omelet type egg product within its plastic wrapping into a liquid nitrogen spray atmosphere. The omelet type egg product remained in the liquid nitrogen atmosphere until the center temperature reached 0°F, which occurred in about 9 minutes. The omelet type egg product was then removed from the liquid nitrogen atmosphere and was placed into a commercial type freezer maintained at a temperature of −20°F. The omelet type egg product was stored for periods of up to 1 year and was examined at periodic intervals to determine the quality of the product when reheated. The omelet type egg product was reheated by placing the omelet type egg product within the plastic overwrap into boiling water and heating for a period of 15 minutes. It was determined that an acceptable product was provided even after storage for periods up to one year under freezer conditions.

What is claimed is:

1. A method for making an omelet type egg product comprising providing egg white and egg yolk in substantially the proportions of whole egg, agitating said egg white and egg yolk sufficiently to break the yolk and provide an egg mix consisting essentially of egg yolk solids, egg white solids and water, adjusting the moisture of said egg mix to a level of from about 78 percent to about 85 percent by weight, preheating said egg mix by steam injection to a temperature in the range of from about 160°F to about 170°F, introducing a predetermined amount of said preheated egg mix into a pan, said pan having a temperature of less than about 200°F at the time of introducing said egg mix into said pan, heating said egg mix in said pan while said egg mix is quiescent until said egg mix is set so as to provide a substantially cooked egg product in the shape of said pan, terminating heating of said egg product, removing said egg product from said pan, folding said removed egg product to provide an omelet type egg product within about 2 minutes from the time heating of the egg product is terminated, said folding being effected in a manner so as to decrease the exterior radius of curvature at the point of folding, said folding of said egg product being effected by supporting a center portion of said egg product and moving opposing edges of said egg product vertically upward so as to cause opposing surfaces adjacent said center portion to pivot upwardly from said center portion and move into substantial alignment in face to face relationship, and restraining said folded egg product in said folded position for at least about 10 seconds.

2. A method in accordance with claim 1 wherein said folding decreases the exterior radius of curvature at the point of folding to less than about three times the thickness of said egg product at the point of folding.

3. A method in accordance with claim 1 wherein said decrease of the exterior radius of curvature occurs within a period of from about 10 seconds to about 60 seconds.

4. A method in accordance with claim 1 wherein said omelet type egg product is frozen by reducing the center temperature of said egg product from a temperature above the freezing point of said egg product to below the freezing point of said egg product within a period of less than about 10 minutes.

5. A method in accordance with claim 4 wherein said freezing is effected by placing said egg product in a cryogenic environment.

6. A method in accordance with claim 5 wherein said egg product is removed from said cryogenic atmosphere prior to attaining a center temperature of less than about −20°F.

7. A method in accordance with claim 1 wherein said egg mix further includes between about 1 and about 5 percent by weight of a farinaceous material selected from wheat flour, rice flour, corn flour, rye flour, barley flour, and mixtures thereof.

* * * * *

UNITED STATES PATENT AND TRADEMARK OFFICE
CERTIFICATE OF CORRECTION

PATENT NO. : 3,958,035

DATED : May 18, 1976

INVENTOR(S) : Stearns, Charles K., et al.

It is certified that error appears in the above-identified patent and that said Letters Patent are hereby corrected as shown below:

Col. 5, line 61, --freezind-- should be "freezing".

Col. 6, line 33, after --corn flour--, insert "rye flour".

Col. 7, line 4, --wapped-- should be "wrapped".

Signed and Sealed this

Thirtieth Day of November 1976

[SEAL]

Attest:

RUTH C. MASON
Attesting Officer

C. MARSHALL DANN
Commissioner of Patents and Trademarks